US010262236B2

(12) United States Patent
Lim et al.

(10) Patent No.: US 10,262,236 B2
(45) Date of Patent: Apr. 16, 2019

(54) NEURAL NETWORK TRAINING IMAGE GENERATION SYSTEM

(71) Applicant: General Electric Company, Schenectady, NY (US)

(72) Inventors: Ser Nam Lim, Niskayuna, NY (US); Arpit Jain, Schenectady, NY (US); David Scott Diwinsky, West Chester, OH (US); Sravanthi Bondugula, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/584,129

(22) Filed: May 2, 2017

(65) Prior Publication Data
US 2018/0322366 A1    Nov. 8, 2018

(51) Int. Cl.
| | |
|---|---|
| *G06K 9/00* | (2006.01) |
| *G06K 9/62* | (2006.01) |
| *G06K 9/66* | (2006.01) |
| *G06T 7/00* | (2017.01) |

(52) U.S. Cl.
CPC ......... *G06K 9/6259* (2013.01); *G06K 9/6256* (2013.01); *G06K 9/66* (2013.01); *G06T 7/0004* (2013.01); *G06T 7/0008* (2013.01); *G06T 2207/20081* (2013.01); *G06T 2207/20084* (2013.01); *G06T 2207/30156* (2013.01); *G06T 2207/30164* (2013.01)

(58) Field of Classification Search
CPC ...... G06K 9/6259; G06K 9/66; G06T 7/0008; G06T 2207/20081; G06T 2207/20084; G06T 2207/30164
See application file for complete search history.

(56) References Cited

U.S. PATENT DOCUMENTS

| | | | |
|---|---|---|---|
| 5,331,550 A * | 7/1994 | Stafford | G06K 9/3233 |
| | | | 382/128 |
| 5,590,218 A | 12/1996 | Ornstein | |
| 7,403,225 B2 | 7/2008 | Singh | |
| (Continued) | | | |

OTHER PUBLICATIONS

Goodfellow; Pouget-Abadle; Mirza, Xu, Warde-Farley; Ozair; Courville; Benglo; "Generative Adversarial Nets", D'epartement d'informatique et de recherche op'erationnelle Universit'e de Montr'eal Montr'eal, QC H3C 3J7, Jun. 10, 2014, (9 pages).

(Continued)

*Primary Examiner* — Ping Y Hsieh
(74) *Attorney, Agent, or Firm* — Peter A. Flynn

(57) ABSTRACT

A system that generates training images for neural networks includes one or more processors configured to receive input representing one or more selected areas in an image mask. The one or more processors are configured to form a labeled masked image by combining the image mask with an unlabeled image of equipment. The one or more processors also are configured to train an artificial neural network using the labeled masked image to one or more of automatically identify equipment damage appearing in one or more actual images of equipment and/or generate one or more training images for training another artificial neural network to automatically identify the equipment damage appearing in the one or more actual images of equipment.

17 Claims, 6 Drawing Sheets

(56) References Cited

U.S. PATENT DOCUMENTS

| | | | |
|---|---|---|---|
| 7,626,596 | B2 | 12/2009 | Kotake et al. |
| 8,045,808 | B2 | 10/2011 | Oliver |
| 8,150,170 | B2 | 4/2012 | Li et al. |
| 9,501,724 | B1 | 11/2016 | Yang et al. |
| 9,552,549 | B1 | 1/2017 | Gong et al. |
| 2009/0034828 | A1* | 2/2009 | Ferro ............... G01N 29/0645 382/144 |
| 2009/0279772 | A1* | 11/2009 | Sun ................... G06K 9/6298 382/141 |
| 2014/0181630 | A1 | 6/2014 | Monney et al. |
| 2015/0170002 | A1* | 6/2015 | Szegedy ............... G06K 9/66 382/156 |
| 2017/0169567 | A1* | 6/2017 | Chefd'hotel ...... G06K 9/00127 |
| 2017/0316281 | A1* | 11/2017 | Criminisi ............ G06K 9/6257 |

OTHER PUBLICATIONS

Karpathy; "CS231n Convolutional Neural Networks for Visual Recognition, Convolutional Neural Networks (CNNs / ConvNets)" http://cs231n.github.io/convolutional-networks/, (26 pages)

Kataoka et al., "Image generation using generative adversarial networks and attention mechanism", 2016 IEEE/15th ACIS International Conference on Computer and Information Science (ICIS), pp. 1-6, Jun. 26-29, 2016, Okayama (6 pages).

Li; Karpathy; "CS231n Convolutional Neural Networks for Visual Recognition", http://cs231n.github.io/neural-networks-1/, 2015, (15 pages).

Long; Shelhamer; Darrell; "Fully Convolutional Networks for Semantic Segmentation", UC Berkeley, The IEEE Conference on Computer Vision and Pattern Recognition (CVPR), 2015, (10 Pages).

Nielsen; "Using Neural Nets to Recognize Handwritten Digits" http://neuralnetworksanddeeplearning.com/chap1.html2, Neural Networks and Deep Learning, Jan. 2017, (54 Pages).

Shrivastava et al., "Learning from Simulated and Unsupervised Images through Adversarial Training", Computer Science > Computer Vision and Pattern Recognition, Nov. 15, 2016 (16 Pages).

Wang et al., "Generative Image Modeling Using Style and Structure Adversarial Networks", Computer Vision—ECCV 2016, vol. 9908, pp. 318-335, Sep. 17, 2016 (18 Pages).

Bousmalis, K., et al., "Unsupervised Pixel-Level Domain Adaptation with Generative Adversarial Networks", IEEE Conference on Computer Vision and Pattern Recognition (CVPR) (Dec. 16, 2016).

Cha, Y-J., et al., "Deep Learning-Based Crack Damage Detection Using Convolutional Neural Networks," Computer-Aided Civil and Infrastructure Engineering, vol. 32, Issue 5, pp. 361-378 (Mar. 23, 2017).

Pathak, D., et al., "Context Encoders: Feature Learning by Inpainting," IEEE Conference on Computer Vision and Pattern Recognition (CVPR), pp. 2536-2544 (2016).

Salimans, T., et al., "Improved Techniques for Training GANs," Proceedings of the 30th International Conference on Neural Information Processing Systems (NIPS), pp. 2234-2242 (Jun. 10, 2016).

Xie, D., et al., "Deep Learning in Visual Computing and Signal Processing," Applied Computational Intelligence and Soft Computing, vol. 2017, pp. 1-13 (Feb. 19, 2017).

Zhu, J-Y., et al., "Learning a Discriminative Model for the Perception of Realism in Composite Images," IEEE International Conference on Computer Vision (ICCV), pp. 3943-3951 (2015).

Extended European Search Report and Opinion issued in connection with corresponding EP Application No. 18170077.4 dated Oct. 8, 2018.

* cited by examiner

NEURAL NETWORK TRAINING IMAGE GENERATION SYSTEM

FIELD

The subject matter described herein relates to image analysis systems that use one or more neural networks.

BACKGROUND

Artificial neural networks can be used to examine images and make predictions of the objects depicted in the images. These neural networks are computerized systems that are trained to identify objects in images. The training of the neural networks can include providing training images to the neural networks. The training images can be images with pixels that are labeled, or annotated, to reflect what type of object (e.g., object class) that each pixel represents. For example, each pixel in a training image can be associated with data or a datum indicative of what object the pixel depicts at least part of.

Creation of training images can be a time-intensive and costly endeavor. Some training images are created by one or more persons manually examining each pixel in an image and annotating or labeling the pixel with data or a datum to identify what object class is represented by the pixel. Some training images are created using crowd sourcing where several people who are not necessarily co-located can review and annotate images to speed up the process of creating training images. But, not all images can be annotated using crowd sourcing. Some images cannot be widely disseminated in a manner that allows for such crowd sourcing. For example, some images of damage to equipment used in connection with or subject to confidentiality agreements or restrictions, such as airplane engines, may not be able to be distributed amongst many people for crowd sourcing of the pixel annotation.

BRIEF DESCRIPTION

In one embodiment, a system includes one or more processors configured to receive input representing one or more selected areas in an image mask. The one or more processors are configured to form a labeled masked image by combining the image mask with an unlabeled image of equipment. The one or more processors also are configured to train an artificial neural network using the labeled masked image to one or more of automatically identify equipment damage appearing in one or more actual images of equipment and/or generate one or more training images for training another artificial neural network to automatically identify the equipment damage appearing in the one or more actual images of equipment.

In one embodiment, a method includes receiving input representing one or more selected areas in an image mask, forming a labeled masked image by combining the image mask with an unlabeled image of equipment, and training an artificial neural network using the labeled masked image to one or more of automatically identify equipment damage appearing in one or more actual images of equipment or generate one or more training images for training another artificial neural network to automatically identify the equipment damage appearing in the one or more actual images of equipment.

In one embodiment, a system includes one or more processors configured to receive an actual image of equipment. The actual image does not include annotations of what object is represented by each pixel in the actual image. The one or more processors also are configured to obtain an image mask, the image mask representing one or more selected areas where damage to the equipment is to appear. The one or more processors are configured to generate a labeled masked image by combining the actual image with the image mask. The labeled masked image includes annotations of what object is represented by plural pixels in the one or more selected areas from the image mask.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
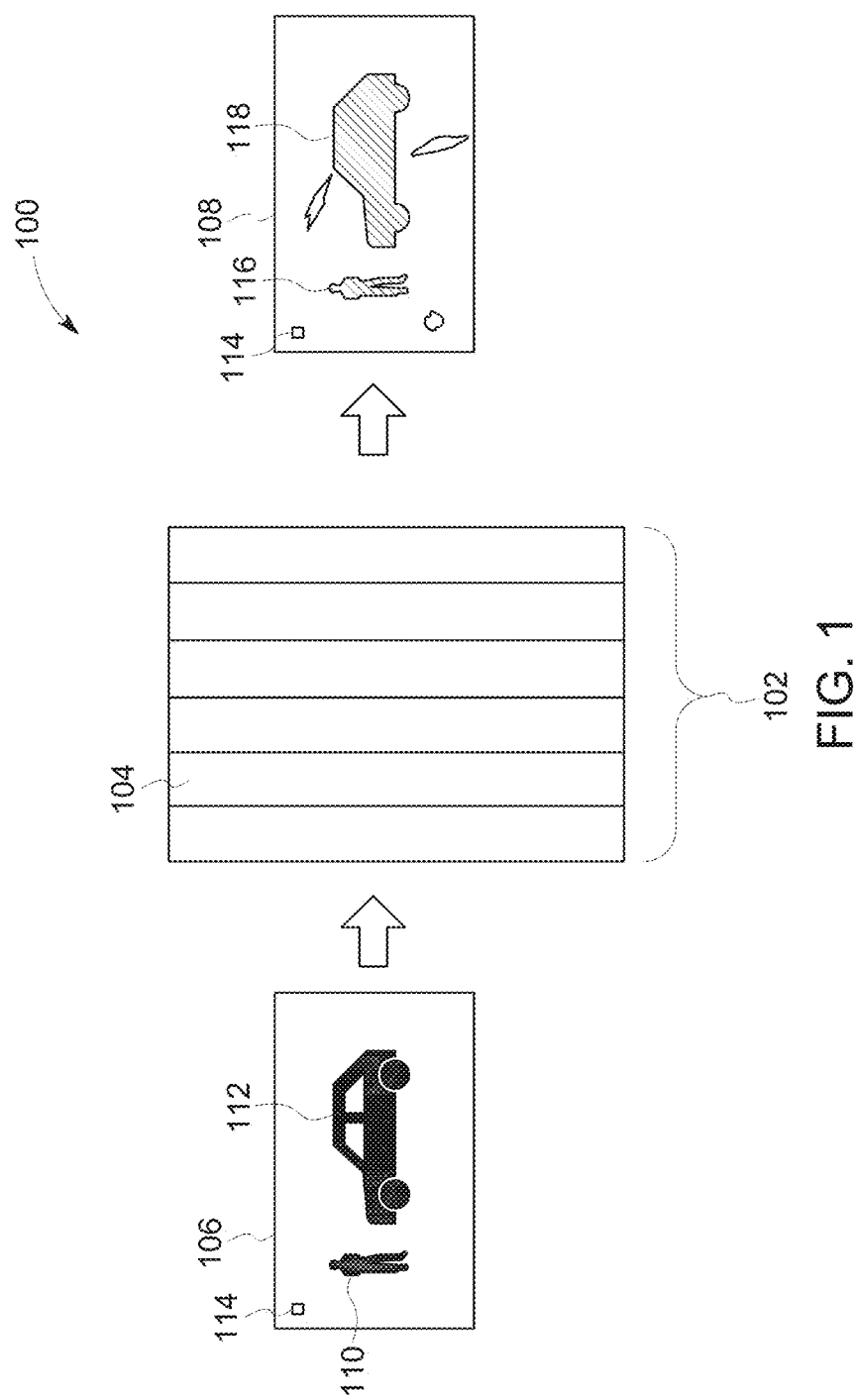
FIG. 1 illustrates one embodiment of an image analysis neural network system.

One or more embodiments of the inventive subject matter described herein provide systems and methods that generate labeled images for training artificial neural networks to automatically identify objects in other images. A deep adversarial network can be used to generate realistic images for annotations that otherwise are expensive to procure, especially if the images are industrial data. In situations where limited training data is available (e.g., supervised images, such as images having pixels that are labeled or annotated with the objects represented by the various pixels), coupled generative adversarial networks and conditional adversarial networks can be used to learn an image generation model that produces realistic annotated images. These images can then be used to train one or more other neural networks to automatically identify similar objects in other images.

But, in an unsupervised setting where annotated or labeled images are not available, simulated data from other models (e.g., computer assisted drawing, or CAD, models), for which the pixel annotations are available, can be used in conjunction with unsupervised data to produce realistic annotated images by learning a realism generator, thereby propagating the annotations of the simulated data to the generated realistic data. A conditional adversarial network can then be trained to generate pixel annotations on a given real image.

At least one technical effect of the subject matter described herein includes creation of annotated training images for neural networks. By leveraging adversarial training between a generator network (of a generative adversarial network) and a discriminator network (of the generative adversarial network) in both supervised and unsupervised settings, realistic annotated images can be produced. In an adversarial training, the generator network learns to generate fake images that are as close to a probability distribution of training image data and can potentially fool the discriminator network into determining that the fake images are real images of the same objects. The task of the discriminator network is to classify the image samples correctly. For example, to identify the training image samples as real images and to identify the generated images (from the generator network) as fake images. By optimizing or otherwise improving on these objectives, an adversarial training between the two models is initiated. After the model is trained, the generator network is deemed to have learned how to generate image samples from the probability distribution of the training image data.

In one embodiment of the inventive subject matter described herein, input images provided to the generator network are conditioned to produce realistic images for provided masks and real images. These produced images are completed as learned (e.g., labeled) images, without use of supervised image data. The simulated images with annotations can be obtained from a CAD model and used to produce realistic images with annotations borrowed from corresponding simulated images. Using the supervised data, training of adversarial networks that are coupled against each other is improved upon such that the generator networks can fool the corresponding discriminator networks. One of the networks can be trained to generate a real image and the other network can be trained to generate a corresponding annotation. A conditional adversarial network can be trained to produce realistic images for a given mask in a completely supervised way by learning a mapping from a mask to a real image. The systems and methods can generate realistic annotated image data in both supervised and unsupervised settings. Real images and corresponding pixel annotations can be generated by the systems with no human intervention (e.g., in labeling any pixel of the images).

At least one technical effect of the systems and methods described herein includes the rapid and accurate identification of objects depicted in one or more images for a variety of end uses, such as for the identification and repair of damage to a component (e.g., repair of a thermal barrier coating in an engine), the automatic changing of movement of a vehicle (e.g., changing a direction of movement and/or applying brakes in response to identifying a person or other object in an image), or the like. In medical applications, the systems and methods can rapidly and accurately identify tumors, lesions, or the like, from images and the systems and methods can automatically implement one or more medical procedures to remove or repair the identified tumor or lesion.

FIG. 1 illustrates one embodiment of an image analysis neural network system 100. The system 100 identifies objects in images using one or more artificial deep neural networks 102. The neural network 102 is an artificial neural network formed from one or more processors (e.g., microprocessors, integrated circuits, field programmable gate arrays, or the like). The neural network 102 is divided into two or more layers 104, such as an input layer that receives an input image 106, an output layer that outputs an output image 108, and one or more intermediate layers. The layers 104 of the neural network 102 represent different groups or sets of artificial neurons, which can represent different functions performed by the processors on the input image 106 to identify objects in the input image 106. The artificial neurons apply different weights in the functions applied to the input image 106 to attempt to identify the objects in the input image 106. The output image 108 is generated by the neural network 102 by assigning or associating different pixels in the output image 108 with different object classes based on analysis of characteristics of the pixels. Because the neural network 102 may not be 100% accurate in predicting what objects are represented by different pixels, the output image 108 may not exactly resemble or depict the objects in the input image 106.

The artificial neurons in the layers 104 of the neural network 102 can examine individual pixels 114 in the input image 106. The processors (operating as the artificial neurons) can use linear classification to calculate scores for different categories of objects (referred to herein as "classes"), such as a tree, a car, a person, spalling of a thermal barrier coating, a crack in a surface, a sign, or the like. These scores can indicate the probability that a pixel 114 represents different classes. For example, the score for a pixel 114 can be represented as one or more of the vectors described above. Each artificial neuron can apply a mathematical function, such as an activation function, to the same pixel, with the functions applied by different neurons impacting the functions applied by other neurons and different neurons applying different weights to different terms in the functions than one or more, or all other neurons. Application of the functions generates the classification scores for the pixels 114, which can be used to identify the objects in the input image 106.

In one embodiment, the input image 106 is provided to the neural network 102 via one or more wired and/or wireless connections from a source, such as a camera. The neurons in the layers 104 of the neural network 102 examine the characteristics of the pixels 114, such as the intensities, colors, or the like, to determine the scores for the various pixels 114. The neural network 102 examines the score vector of each pixel 114 after the layers 104 of the neural network 102 have determined the score vectors for the pixels 114 and determines which object class has the highest probability for each pixel 114 or which object class has a higher probability than one or more, or all, other object classes for each pixel 114.

For example, a first pixel 114 having a score vector of [0.6 0.15 0.05 0.2] indicates that the neural network 102 calculated a 60% probability that the first pixel 114 represents a first object class (e.g., a human body or person), a 15% probability that the first pixel 114 represents a second object class (e.g., a car), a 5% probability that the first pixel 114 represents a third object class (e.g., a tree), and a 20% probability that the first pixel 114 represents a fourth object class (e.g., the ground). These probabilities can be represented by the output image 108, with different areas 116, 118 representative of different objects based on these calculated probabilities. The areas 116, 118 may slightly represent the objects 110, 112, but may not accurately represent or indicate the objects 110, 112 due to the probabilities being less than 100%. The processors can determine that the pixel 114 represents the object class having the greatest or largest of these probabilities. For example, the processors can determine that the pixel 114 represents a human person due to the 60% probability. This process can be repeated for several, or all, other pixels 114.

The functions and weights used by the neurons in the neural network 102 can be created and/or modified based on training images provided to the neural network 102. The training images can be referred to as supervised, labeled, and/or annotated images because these images have pixels 114 that are previously designated as representing different object classes (e.g., with a 100% probability of which object class is represented by each pixel 114). One or more embodiments of the inventive subject matter described herein can be used to create the training images.

In one embodiment, the neural network 102 is trained by inputting the training images (e.g., labeled training images 206 shown in FIG. 2) into the neural network 102 as the images 106 and examining the output images 108 from the neural network 102. These training images are not manually labeled training images in one embodiment, as described below. The output images 108 can be examined (e.g., by the neural network 102 and/or by one or more users or operators of the system 100) to determine how closely the training and output images match each other. Differences between these images can be determined, and the functions and/or weights used by the neural network 102 to examine the training images can be modified to change the output images 108. This process can be iteratively repeatedly until the output images 108 match or are closer to the training images input to the neural network 102, and/or until the neural network 102 can automatically and accurately identify objects (e.g., objects 110, 112) in the training images.

Figure 2:
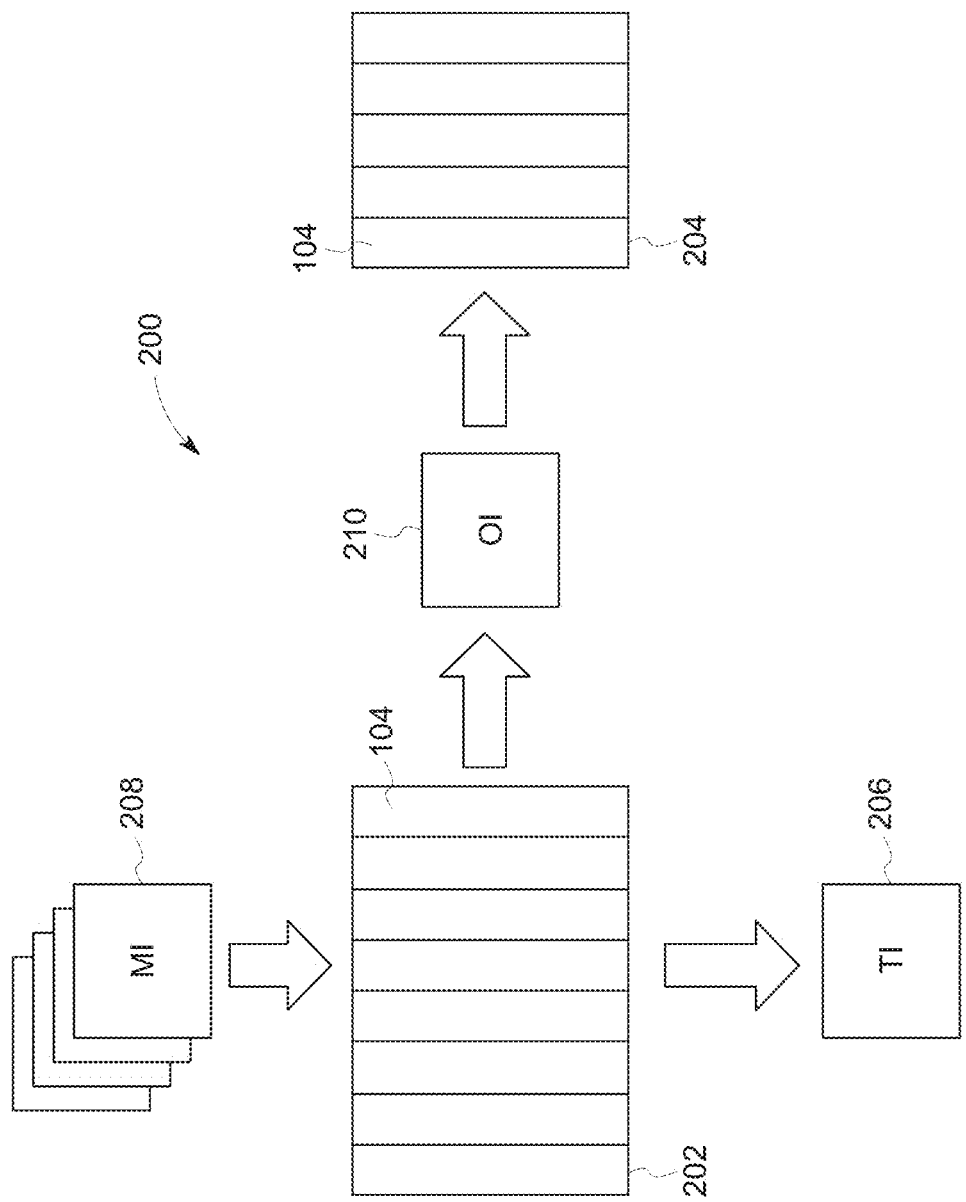
FIG. 2 illustrates one embodiment of a generative adversarial network (GAN) system.

FIG. 2 illustrates one embodiment of a GAN system 200. The GAN system 200 includes artificial neural networks, namely a generator neural network 202 and a discriminator neural network 204. Each of the generator and discriminator networks 202, 204 can be an artificial neural network formed from one or more processors and composed of the layers 104 of artificial neurons, as described above. These networks 202, 204 can interact in a setting of a two-player minimax game to learn how to generate labeled training images 206 ("TI" in FIG. 2). These training images 206 can be used to train the neural network 102 to automatically identify objects 110, 112 other images 106, as described above.

The generator network 202 can be provided with masked images 208 ("MI" in FIG. 2 and described below) that include labeled or annotated pixels 114. The masked images 208 are used to train the generator network 202 to create the labeled training images 206. The labeled training images 206 can be communicated to another neural network, such as the neural network 102, to train the neural network 102 to automatically identify objects in images 106, as described above.

To generate the labeled training images 206, the generator network 202 determines distributions of characteristics of the pixels 114, such as Gaussian distributions of intensities, colors, or the like, of the pixels 114 in various locations in the masked images 208. The masked images 208 can depict the same or similar objects, such as spalling, cracking, or other damage of thermal barrier coatings (or other coatings) in an engine (e.g., a turbine engine). These distributions can indicate the likelihood that a pixel 114 in an image will have a certain set of characteristics. For example, based on the distributions of pixel characteristics in an image of spalling of a thermal barrier coating on a turbocharger nozzle, the generator network 202 can create an output image 210 ("OI" in FIG. 2).

The output image 210 includes or is formed from pixels 114 having characteristics that are most or more likely to occur in an image of spalling based on the distributions of pixel characteristics that are determined from the masked images 208 (e.g., more likely to occur than distributions of pixels in images that do not show spalling). The output image(s) 210 created by the generator network 202 is not a copy or exact replica of any of the mask images 208 that are input into the generator network 202 in one embodiment. For example, because the output images 210 are created based on statistical distributions (e.g., Gaussian distributions) of the colors, intensities, or the like, of the pixels 114 in the mask images 208, and are not exact copies of the mask images 208, the mask images 208 may appear different from the output images 210.

The generator network 202 provides the output image(s) 210 (e.g., via one or more wired and/or wireless connections) to the discriminator network 204. The discriminator network 104 examines the output images 210 to try and identify objects appearing in the output images 210, like the way the neural network 102 (shown in FIG. 1) operates. The discriminator network 204 can examine characteristics of the pixels in the output image 210 to determine whether one or more objects appear in the output image 210, such as spalling or cracking of a coating in a turbine engine. The discriminator network 204 can examine the contents of the output image 210 and determine one or more loss functions or errors for the output image 210. The loss functions or errors can represent a confidence that the output image 210 depicts one or more objects (e.g., spalling) and not another object. For example, large loss functions or errors can indicate that the output image 210 shows something other than spalling, while smaller loss functions or errors can indicate that the output image 210 shows spalling of a thermal barrier coating.

The discriminator network 204 can determine the loss function or error by examining characteristics of the pixels in the output image 210. For example, the discriminator network 204 can determine that the characteristic of a first pixel in the output image 210 is more similar to the distribution of pixel characteristics associated with the masked image(s) 208 than a different, second pixel in the output image 210. The distribution of pixel characteristics in the masked image(s) 208 can be provided to and/or determined by the discriminator network 204 (e.g., for example, by calculating how frequently the pixels in the masked image(s) 208 have various characteristics). The first pixel can be associated (by the discriminator network 204) with a smaller error or loss function than the second pixel. The loss functions and/or errors can be determined for many or all pixels in the output image 210. Output images 210 having pixels with smaller loss functions or errors can be determined (e.g., by the discriminator network 210) to depict or more accurately depict objects appearing in the masked image(s) 208 than output images 210 having larger loss functions or errors.

In one embodiment, the artificial neurons in the layers 106 of the discriminator network 204 can examine individual pixels in the output image 210. The processors (operating as the artificial neurons) can use linear classification to calculate scores for different categories of objects (referred to herein as "classes"), such as spalling of a thermal barrier coating, a crack in a surface, or the like. These scores can indicate the probability that a pixel represents different classes. Each artificial neuron can apply a mathematical function, such as an activation function, to the same pixel, with the functions applied by different neurons impacting the functions applied by other neurons and different neurons applying different weights to different terms in the functions than one or more, or all other neurons. Application of the functions generates the classification scores for the pixels, which can be used to identify the objects in the output image 210. The neurons in the layers 106 of the discriminator network 204 examine the characteristics of the pixels in the output image 210, such as the intensities, colors, or the like, to determine the scores for the various pixels.

For example, the discriminator network 204 can determine that a pixel in one of the output images 210 has a score vector of [0.6 0.15 0.25]. This score vector indicates that the discriminator network 204 has calculated a 60% probability that the pixel represents a first object class (e.g., spalling of a thermal barrier coating), a 15% probability that the pixel represents a second object class (e.g., a crack the coating), and a 25% probability that the pixel represents a third object class (e.g., an undamaged area of the coating). This process can be repeated for several, or all, other pixels in the same output image 210.

The processors of the discriminator network 204 can then determine the loss functions or errors for the pixels in the output image 210 based on these probabilities. The loss function or error can be calculated as a difference between a selected object class for a pixel 114 and the object score for that object class. This error value can be a difference between 100% (or one) and the probability of the selected object class. With respect to the preceding example, the first object class is the selected object class for the pixel because the first object class has a larger probability (i.e., 60%) than the other object classes for that same pixel. The loss function or error for that pixel can be calculated as [0.4-0.15-0.25]. The value of 0.4 (or 40%) is calculated as the difference between one and 0.6 (or between 100% and 60%). This process can be repeated for several, or all, of the pixels.

If the discriminator network 204 determines that the output image 210 depicts a recognized object also appearing in the masked images 208, then the generator network 202 has successfully tricked or fooled the discriminator network 204 into determining that the output image 210 is an actual or real image of the object (e.g., spalling or a crack in a thermal barrier coating). The discriminator network 204 can examine the loss functions of the output image 210 and compare the loss functions to one or more thresholds to determine if the output image 210 depicts an object that is the same as or similar to (e.g., the same object class as) an object in the masked images 208. If the loss function or error is greater than the threshold, then the discriminator network 204 may not identify the output image 210 as depicting the object that is the same as or similar to the object in the masked image(s) 208. But, if the loss function or error is not greater than the threshold, then the discriminator network 204 may identify the output image 210 as showing the object that is the same as or similar to one or more objects appearing in the masked image(s) 208.

But, if the discriminator network 204 is not tricked or fooled into determining that the output image 210 is an actual or real image of the same object(s) or same type of object(s) as those appearing in the masked images 208, then the discriminator network 204 can communicate a signal to the generator network 202. In response to receiving this signal, the generator network 202 can change how the output images 210 are created. For example, the generator network 202 can modify one or more of the pixel distributions, can obtain one or more additional masked images 208 to determine or update the pixel distributions, can change one or more functions or weights applied by artificial neurons in the layers 104 of the generator network 202 to create the output images 210, or the like. This can result in additional output images 210 being different from previously created output images 210. The discriminator network 204 examines these new output images 210 to determine if the new output images 210 show the same or similar objects as in the masked images 208, as described above. This process can be iteratively repeated unless or until the generator network 202 can fool or trick the discriminator network 204 into determining that the output images 210 are actual or real images of the objects appearing in the masked images 208.

The generator network 202 can then create one or more of the training images 206. For example, once the generator network 202 can create the output images 210 that trick or fool the discriminator network 204 (as described above), the generator network 202 can create additional output images 210 as the training images 206. The training images 206 can be communicated (e.g., via one or more wired and/or wireless connections) to the neural network 102 (shown in FIG. 1) for training the neural network 102 to automatically identify objects in other unlabeled or non-training images 106, as described above. The training images 206 include designations or labels for what object classes are represented by the various pixels 114 making up the training images 206. The labels can indicate a 100% certainty or probability of what object class is represented by each pixel 114. The training images 206 can be created without manual intervention. For example, the training images 206 can be created by the GAN system 200 without a person labeling or annotating any of the pixels 114 making up the training images 206.

In one embodiment of the subject matter described herein, the systems and methods operate to create the masked images 208 provided to the generator network 202 to train the generator network 202 without having the pixels 114 of the masked images 208 being manually labeled by one or more persons, users, or operators. This can speed up the process for obtaining the masked images 208 used to train the generator network 202 to create the training images 206 that are then used to train the neural network 102 (relative to manual labeling of images used to train the generator network 202). Optionally, the masked images 208 that are created can be used to directly train the neural network 102. For example, the masked images 208 can be provided to the neural network 102 as labeled training images that are used to train the neural network 102 as described above, instead of providing the masked images 208 to the generator network 202 (for training the generator network 202 to create the training images 206).

Figure 3:
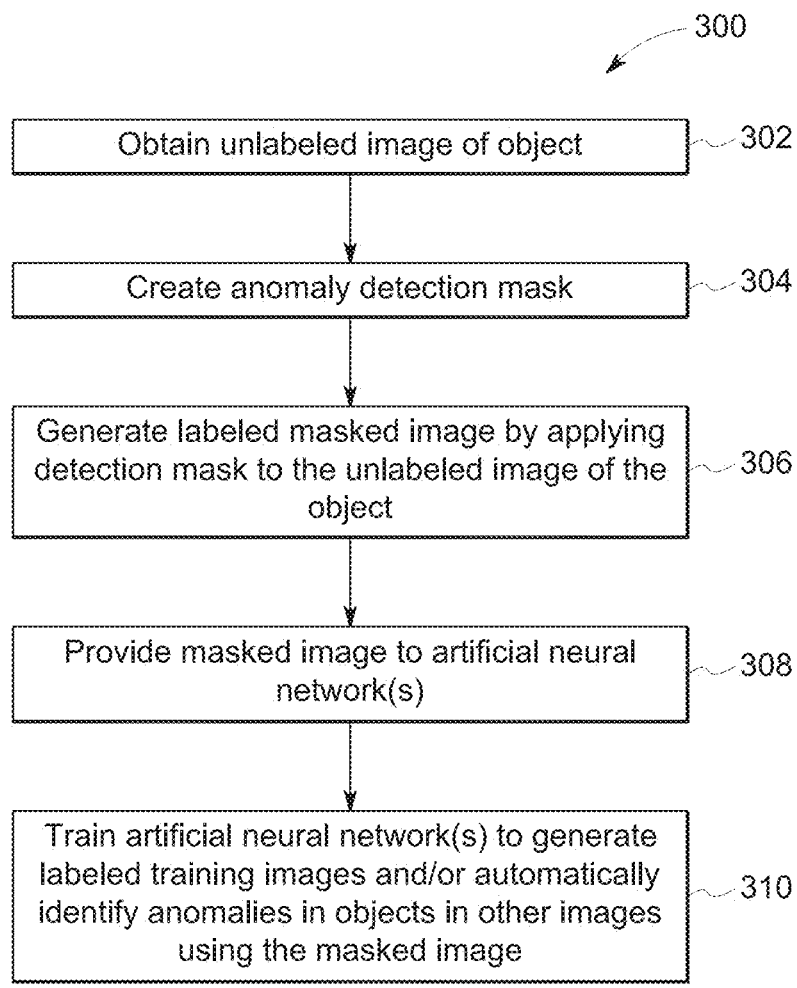
FIG. 3 illustrates a flowchart of one embodiment of a method for creating labeled masked images.

FIG. 3 illustrates a flowchart of one embodiment of a method 300 for creating labeled masked images. The flowchart of the method 300 can represent operations performed by a neural network training image generation system described below, such as functions performed by one or more processors (e.g., one or more microprocessors, field programmable gate arrays, and/or integrated circuits) under the direction of software, to create the masked images 208 described herein. Optionally, the method 300 can represent an algorithm used to write such software.

Figure 4:
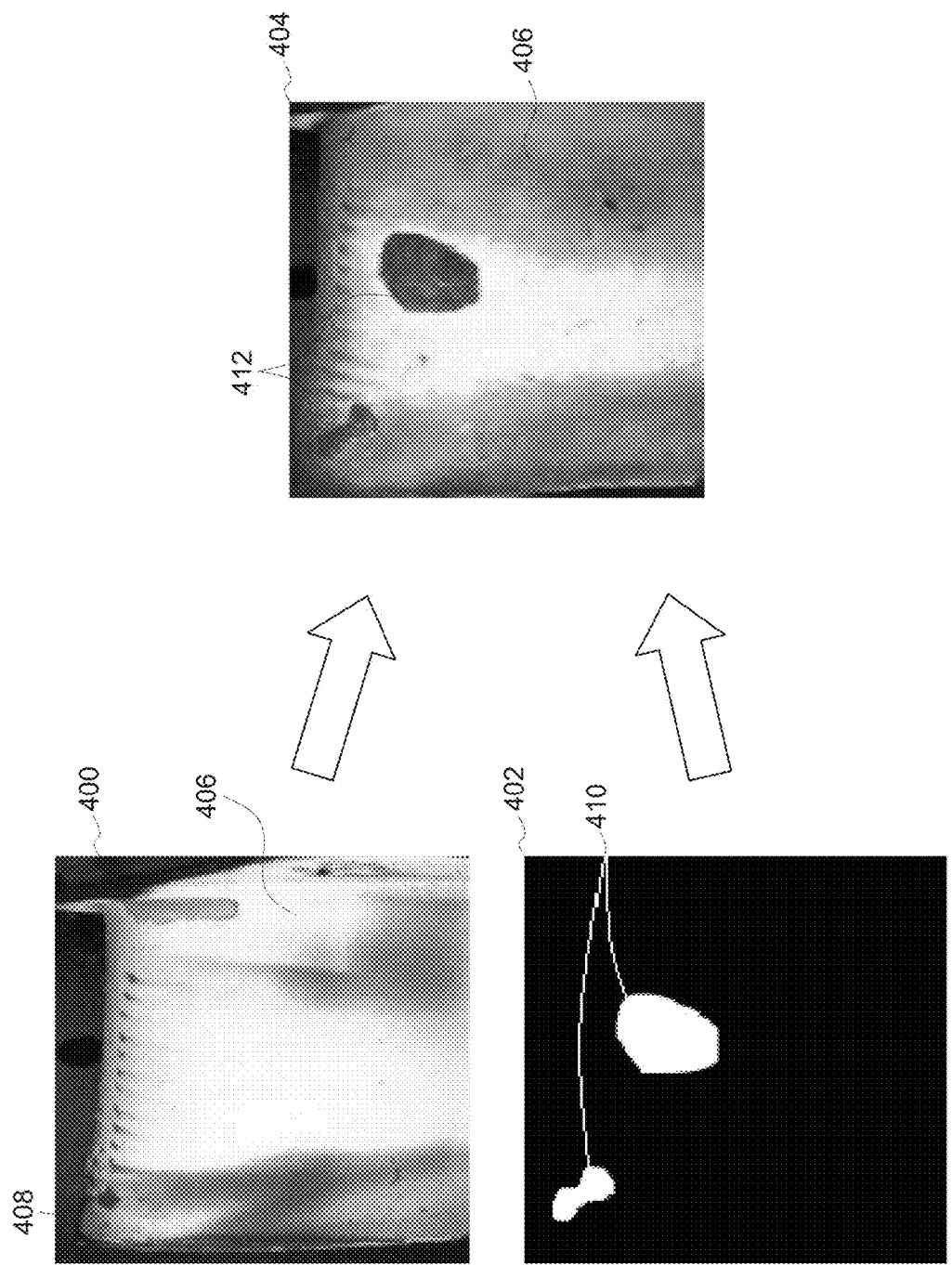
FIG. 4 illustrates examples of an unlabeled image, an anomaly detection mask, and a labeled masked image.
Figure 5:
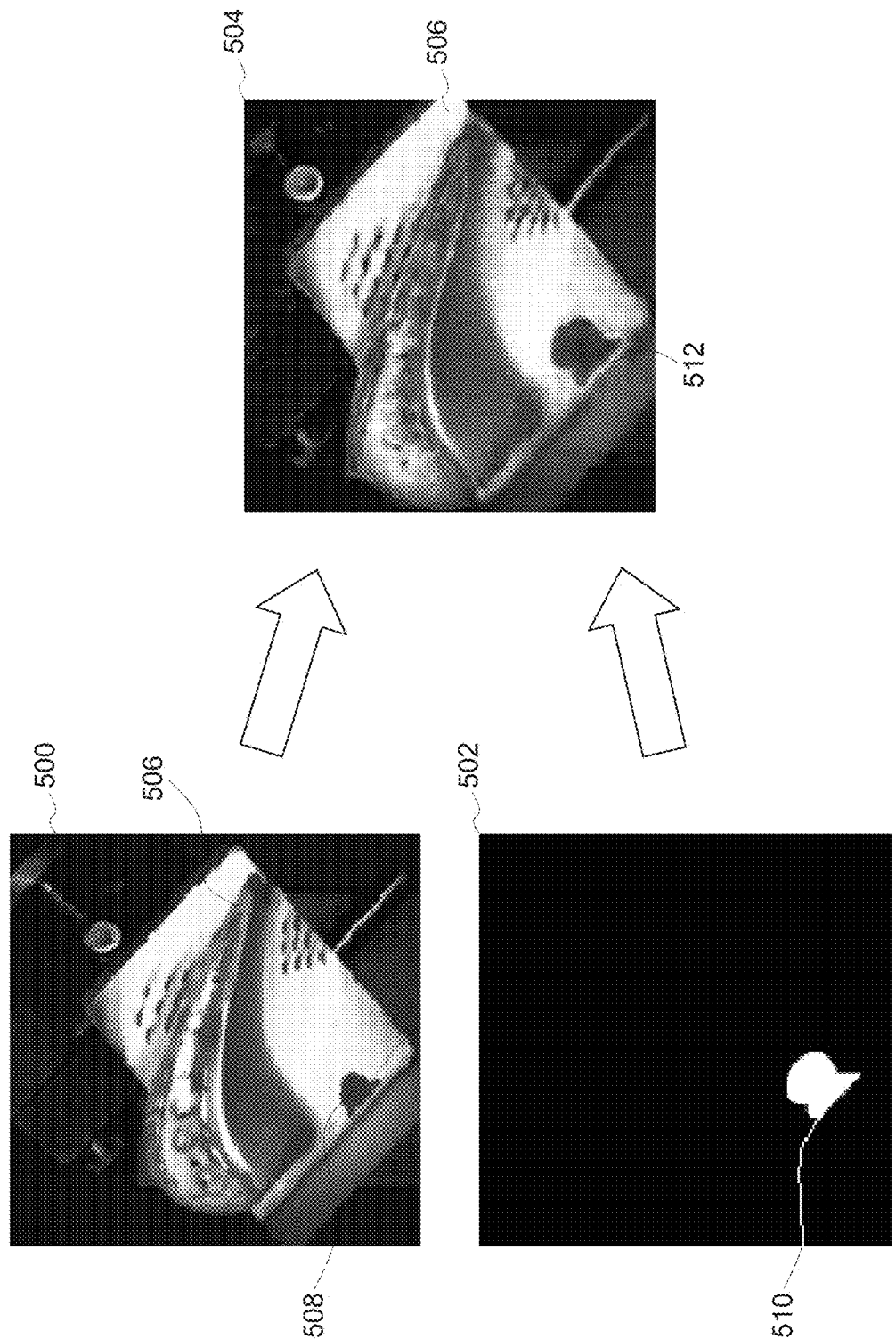
FIG. 5 illustrates additional examples of an unlabeled image, an anomaly detection mask, and a labeled masked image.

At 302, an unlabeled image of one or more objects is obtained. In one embodiment, the image is unlabeled in that not all, or none, of the pixels 114 in the image have been previously designated as to what object or objects are shown in the image. FIGS. 4 and 5 illustrate examples of unlabeled images 400, 500, anomaly detection masks 402, 502 (described below), and labeled masked images 404, 504 (also described below). The unlabeled image 400 shown in FIG. 4 depicts a partial side view of a turbocharger blade 406 while the unlabeled image 500 shown in FIG. 5 depicts a top view of another turbocharger blade 506. Anomalies 408, 508 appear in each of the unlabeled images 400, 500. These anomalies 408, 508 are spalling of thermal barrier coatings on the turbocharger blades 406, 506 or on surfaces near the turbocharger blades 406, 506 in the illustrated examples. The unlabeled images 400, 500 can be obtained from one or more cameras and/or one or more computer-readable memories.

Returning to the description of the flowchart of the method 300 shown in FIG. 3, at 304, an anomaly detection mask is created. The anomaly detection mask can be created by identifying or selecting one or more regions in the unlabeled image that are to artificially represent anomalies. For example, one or more two dimensional areas or shapes can be selected or identified as representing spalling. In FIGS. 4 and 5, two dimensional areas 410, 510 are selected as artificial anomalies in the anomaly detection masks 402, 502. The areas 410, 510 are artificial anomalies in that the areas 410, 510 will be added to, superimposed onto, or otherwise combined with the unlabeled images 400, 500 to add labeled anomalies or areas to the unlabeled images 400, 500, as described below.

The areas 410, 510 can be randomly selected, can be manually selected, or can be based off one or more images of actual anomalies (e.g., other images of spalling in thermal barrier coatings in turbochargers). For example, the locations, size, and/or shape of the areas 410, 510 can be identical to or scaled from an actual image of spalling of another turbocharger.

The anomaly detection masks 402, 502 can be binary representations of areas that do or do not represent anomalies. In the illustrated example, the selected areas 410, 510 represent spalling of a coating and the other areas in the masks 402, 502 that are outside of or otherwise not included within the selected areas 410, 510 do not represent spalling of the coating. The anomaly detection masks 402, 502 can be labeled images or labeled representations of images in that the binary representations indicate what each pixel 114 in the anomaly detection masks 402, 502 represent. For example, the pixels 114 within the selected areas 410, 510 can have a 100% probability or certainty of representing an anomaly (e.g., spalling, cracks, etc.) while the pixels 114 outside of or otherwise not included in the selected areas 410, 510 a have a 0% probability or certainty of representing the anomaly. Optionally, the masks 402, 502 can be tertiary or greater representations of different areas or groupings of pixels. For example, the masks 402, 502 can include first areas encompassing pixels 114 that are labeled as representing a first object (e.g., spalling of a coating), second areas encompassing pixels 114 that are labeled as representing a different, second object (e.g., cracks in a coating), third areas encompassing pixels 114 that are labeled as representing a different, third object (e.g., background or coating that is not damaged), and so on.

Returning to the description of the flowchart of the method 300 shown in FIG. 3, at 306, a labeled masked image is created. The labeled masked image (e.g., the masked image 208 shown in FIG. 2) can be created by combining the mask 402, 502 and the unlabeled image 400, 500 shown in FIGS. 4 and 5. For example, the mask 402 can be applied to the unlabeled image 400 to form a labeled masked image 404 and the mask 502 can be applied to the unlabeled image 500 to form a labeled masked image 504, as shown in FIGS. 4 and 5. The masks 402, 502 can be applied to the unlabeled images 400, 500 by superimposing the masks 402, 502 onto the unlabeled images 400, 500, by overlaying the masks 402, 502 onto the unlabeled images 400, 500, by replacing pixels 114 in the unlabeled images 400, 500 with the pixels 114 in the selected area(s) 410, 510 of the corresponding mask 402, 502, or the like. For example, the unlabeled pixels 114 in the unlabeled image 400 that correspond with the labeled pixels 114 in the selected area 410 of the mask 402 may be replaced with the labeled pixels 114 of the mask 402. Optionally, the probability of the object class represented by the pixels 114 in the unlabeled image 400 that correspond with the labeled pixels 114 in the selected area 410 of the mask 402 can be changed to a 100% probability or certainty that the pixels 114 represent the anomaly 408.

In applying the masks 402, 502 to the unlabeled images 400, 500 to form the labeled masked images 404, 504, the labeled masked images 404, 504 include created or artificial anomalies 412, 512 in the areas of the images 404, 504 that correspond to the locations of the areas 410, 510. As shown in FIGS. 4 and 5, in the labeled masked images 404, 504, the artificial anomalies 412, 512 can replace, occlude view of, entirely overlap, or at least partially overlap real anomalies 408, 508 appearing in the images 400, 500. The masked images 404, 504 are thereby created to include anomalies (e.g., damage such as spalling or cracks) in the areas of the objects 406, 506 appearing in the original images 400, 500. This can provide an easier and faster technique for creating labeled images 406, 506 than manually labeling the pixels 114 in the images 400, 500, 406, 506. The pixels 114 in the masks 402, 502 that are outside of the areas 410, 510 can be labeled as not representing anomalies (e.g., damage), such as by labeling these pixels 114 with a zero probability of the anomaly object class, a 100% probability of the equipment (e.g., turbine blade), or the like.

Returning to the description of the flowchart of the method 300 shown in FIG. 3, at 308, the labeled masked image is provided to an artificial neural network. In one embodiment, the labeled masked image 404, 504 can be communicated to the generator network 202 of the GAN system 200 shown in FIG. 2. The labeled masked image 404, 504 can be provided to the generator network 202 as the masked image 208 for the training the generator network 202 to create the output image 210 and/or training image 206, as described above. Alternatively, the labeled masked image can be provided to the neural network 102 shown in FIG. 1 as a training image for training the neural network 102. For example, instead of using the labeled masked image for training the generator network 202 to create the training image(s) 206, the labeled masked image can be provided to the neural network 102 as a training image.

At 310, the neural network is trained using the labeled masked image. As described above, the labeled masked image can be provided to the generator network 202 to train the generator network 202 to create output images 210 in attempts to trick or fool the discriminator network 204 (and then eventually create training images 206 for the neural network 102). Optionally, the labeled masked image can be provided to the neural network 102 to train the neural network 102 to automatically identify objects in images 106.

Figure 6:
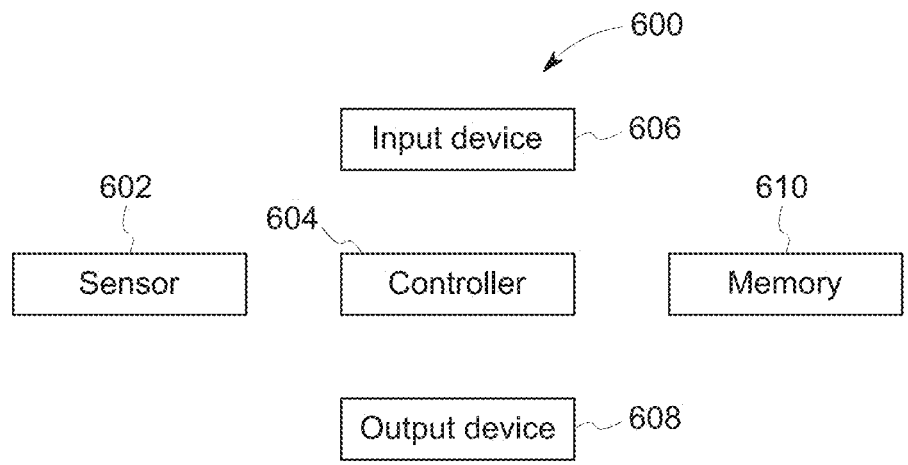
FIG. 6 illustrates one embodiment of a neural network training image generation system.

FIG. 6 illustrates one embodiment of a neural network training image generation system 600. The system 600 can be used to create the labeled masked images 208 described above. The system 600 includes a sensor 602, such as a camera, that provides actual or real images on which the masks are applied. For example, the sensor 602 can obtain photos of equipment and provide the photos to a controller 604 as images similar to the images 400, 500 shown in FIGS. 4 and 5. Optionally, the controller 604 can obtain these images from a memory 610, such as a computer hard drive, server, optical drive, flash drive, or the like. The controller 604 represents hardware circuitry that includes and/or is connected with one or more processors (e.g., one or more microprocessors, field programmable gate arrays, and/or integrated circuits) that receive the real or unlabeled images (e.g., images 400, 500), receive input from one or more input devices 606 to represent the masks (e.g., the masks 402, 502), and apply the masks to the unlabeled images to form the labeled masked images.

The input device 606 can represent a keyboard, stylus, electronic mouse, touchscreen, or the like, that receives operator input indicating where the artificial anomalies (e.g., anomalies 412, 512 and/or the selected areas 410, 510) are to be shown in the masks and/or unlabeled images. Optionally, the locations of the selected areas and/or anomalies can be automatically selected by the controller 604 in a random manner or based on locations of anomalies in one or more other labeled masked images or unlabeled images. The controller 604 optionally can label the pixels 114 of the labeled masked image with object class probabilities indicative of the artificial anomalies. For example, the controller 604 can set the value of the object class probability of the anomaly object class to 100% for those pixels in the selected areas of the mask and in the areas of the artificial anomalies.

An output device 608 receives the labeled masked image from the controller 604 and provides the labeled masked image to an operator and/or a neural network. For example, the output device 608 can include a display device or touchscreen for visually presenting the labeled masked image to an operator, and/or can include communication circuitry (e.g., modems, antennas, or the like) for interfacing with one or more wired and/or wireless connections for communicating the labeled masked image to the neural network 102 and/or the generator network 202.

Figure 7:
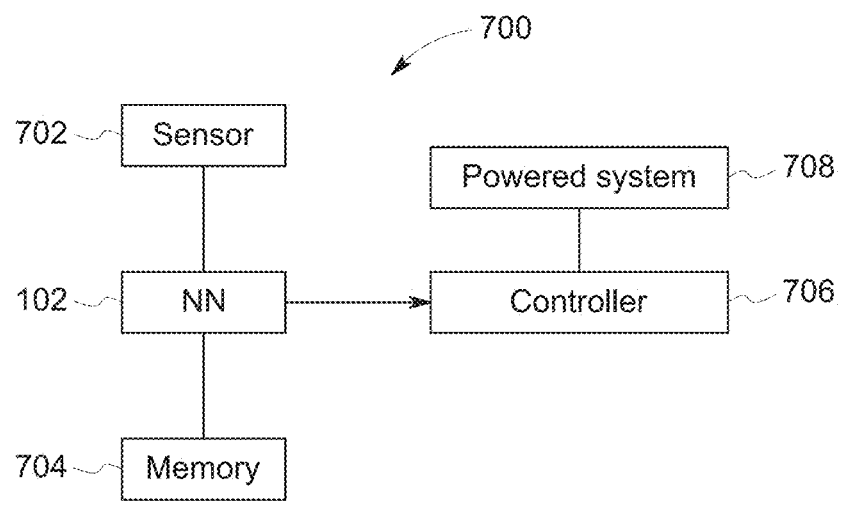
FIG. 7 illustrates one example of a visual anomaly detection system.

FIG. 7 illustrates one example of a visual anomaly detection system 700. The system 700 includes the neural network 102 described above, which automatically identifies objects in images, as described above. The system 700 includes a sensor 702 that obtains images of objects, such a camera that provides images or video frames of equipment to the neural network 102 as the images 106. Optionally, the control system 700 includes a memory 704, such as a computer hard drive, optical disc, or the like, that stores the images 106 for the neural network 102.

The neural network 102 can automatically identify objects in images, such as spalling or cracks in thermal barrier coatings on turbine blades, automatically identify persons or other objects near a moving vehicle, or the like. The identified objects can be communicated to a controller 706 of an automated powered system 708. The controller 706 represents hardware circuitry that includes and/or is connected with one or more processors (e.g., one or more microprocessors, field programmable gate arrays, integrated circuits, etc.). The controller 706 controls operation of the powered system 708, which can represent an automated robotic system that operates to repair the component, such as by spraying an additive onto a coating of the component, by replacing the component, or the like, responsive to an anomaly being identified by the neural network 102. Optionally, the controller 706 can change a direction of travel and/or slow or stop movement of a vehicle (that is or that includes the powered system 708) to avoid collision with an object identified by the neural network 102.

In one embodiment, a system includes one or more processors configured to receive input representing one or more selected areas in an image mask. The one or more processors are configured to form a labeled masked image by combining the image mask with an unlabeled image of equipment. The one or more processors also are configured to train an artificial neural network using the labeled masked image to one or more of automatically identify equipment damage appearing in one or more actual images of equipment and/or generate one or more training images for training another artificial neural network to automatically identify the equipment damage appearing in the one or more actual images of equipment.

Optionally, the one or more processors are configured to receive the input representing locations of where artificial anomalies are to appear on the equipment in the labeled masked image.

Optionally, the equipment includes a turbine engine and the one or more selected areas indicate locations on the turbine engine where damage to a coating of the turbine engine is to appear in the labeled masked image.

Optionally, pixels of the labeled masked image are annotated with indications of objects represented by the pixels.

Optionally, pixels of the unlabeled image are not annotated with indications of objects represented by the pixels.

Optionally, the image mask is a binary mask including two different types of areas to appear in the labeled masked image.

Optionally, a first type of the types of areas to appear in the labeled masked image is an artificial appearance of damage to the equipment and a second type of the types of areas to appear in the labeled masked image is an unchanged portion of the unlabeled image.

In one embodiment, a method includes receiving input representing one or more selected areas in an image mask, forming a labeled masked image by combining the image mask with an unlabeled image of equipment, and training an artificial neural network using the labeled masked image to one or more of automatically identify equipment damage appearing in one or more actual images of equipment or generate one or more training images for training another artificial neural network to automatically identify the equipment damage appearing in the one or more actual images of equipment.

Optionally, the input that is received represents locations of where artificial anomalies are to appear on the equipment in the labeled masked image.

Optionally, the equipment includes a turbine engine and the one or more selected areas indicate locations on the turbine engine where damage to a coating of the turbine engine is to appear in the labeled masked image.

Optionally, pixels of the labeled masked image are annotated with indications of objects represented by the pixels.

Optionally, pixels of the unlabeled image are not annotated with indications of objects represented by the pixels.

Optionally, the image mask is a binary mask including two different types of areas to appear in the labeled masked image.

Optionally, a first type of the types of areas to appear in the labeled masked image is an artificial appearance of damage to the equipment and a second type of the types of areas to appear in the labeled masked image is an unchanged portion of the unlabeled image.

In one embodiment, a system includes one or more processors configured to receive an actual image of equipment. The actual image does not include annotations of what object is represented by each pixel in the actual image. The one or more processors also are configured to obtain an image mask, the image mask representing one or more selected areas where damage to the equipment is to appear. The one or more processors are configured to generate a labeled masked image by combining the actual image with the image mask. The labeled masked image includes annotations of what object is represented by plural pixels in the one or more selected areas from the image mask.

Optionally, the one or more processors are configured to train an artificial neural network using the labeled masked image to automatically identify equipment damage appearing in one or more additional images of equipment.

Optionally, the one or more processors are configured to generate one or more training images for training an artificial neural network to automatically identify equipment damage appearing in the one or more additional images of equipment.

Optionally, the equipment includes a turbine engine and the one or more selected areas indicate locations on the turbine engine where damage to a coating of the turbine engine is to appear in the labeled masked image.

Optionally, the image mask is a binary mask including two different types of areas to appear in the labeled masked image.

Optionally, a first type of the types of areas to appear in the labeled masked image is an artificial appearance of damage to the equipment and a second type of the types of areas to appear in the labeled masked image is an unchanged portion of the unlabeled image.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising: one or more processors configured to receive input representing one or more selected areas in an image mask, the one or more processors configured to form a labeled masked image by combining the image mask with an unlabeled image of equipment, wherein the one or more processors are configured to train an artificial neural network using the labeled masked image to one or more of automatically identify equipment damage appearing in one or more actual images of equipment or generate one or more training images for training another artificial neural network to automatically identify the equipment damage appearing in the one or more actual images of equipment; and further comprising at least one generative adversarial network (GAN) communicatively coupled to the one or more processors, the at least one generative adversarial network comprising: a generator network: and a discriminator network, the discriminator network for classifying images correctly, wherein the generator network generates at least one fake image that is as close to a probability distribution of the one or more training images and can potentially fool the discriminator network into determining that the at least one fake images is a real image of a subject object of the one or more training images, and wherein the image mask is a binary mask including two different types of areas to appear in the labeled masked image.

2. The system of claim 1, wherein the one or more processors are configured to receive the input representing locations of where artificial anomalies are to appear on the equipment in the labeled masked image, and
   wherein the one or more processors comprises at least one of a microprocessor, and an integrated circuit.

3. The system of claim 1, wherein the equipment includes a turbine engine and the one or more selected areas indicate locations on the turbine engine where damage to a coating of the turbine engine is to appear in the labeled masked image, and
   wherein the equipment damage includes at least one of a crack and a spall of the coating of the turbine engine.

4. The system of claim 1, wherein pixels of the labeled masked image are annotated with indications of objects represented by the pixels, and
   wherein the one or more processors comprises at least one field programmable gate array.

5. The system of claim 1, wherein pixels of the unlabeled image are not annotated with indications of objects represented by the pixels.

6. The system of claim 1, wherein a first type of the types of areas to appear in the labeled masked image is an artificial appearance of damage to the equipment and a second type of the types of areas to appear in the labeled masked image is an unchanged portion of the unlabeled image, and wherein the generator network and the discriminator network interact in a setting of a two-player minimax game to generate the labeled masked image.

7. A method comprising: receiving input representing one or more selected areas in an image mask; forming a labeled masked image by combining the image mask with an unlabeled image of equipment; and training an artificial neural network using the labeled masked image to one or more of automatically identify equipment damage appearing in one or more actual images of equipment or generate one or more training images for training another artificial neural network to automatically identify the equipment damage appearing in the one or more actual images of equipment and further comprising: at least one generative adversarial network (GAN) communicatively coupled to the one or more processors, the at least one generative adversarial network comprising: a generator network: and a discriminator network, the discriminator network for classifying images correctly, wherein the discriminator network sends a signal to the generator network indicating that the labeled masked image does not depict the one or more objects in the one or more actual images of equipment, wherein the generator network, in response to receiving the signal from the discriminator network, changes how the labeled masked image is generated, and wherein a first type of the types of areas to appear in the labeled masked image is an artificial appearance of damage to the equipment and a second type of the types of areas to appear in the labeled masked image is an unchanged portion of the unlabeled image.

8. The method of claim 7, wherein the input that is received represents locations of where artificial anomalies are to appear on the equipment in the labeled masked image, and
wherein forming a labeled masked image further comprises forming a labeled masked image based on at least one statistical distribution of at least one of at least one color of a pixel of the labaled masked image and at least one intensity of a pixel of the labaled masked image.

9. The method of claim 8, wherein the equipment includes a turbine engine and the one or more selected areas indicate locations on the turbine engine where damage to a coating of the turbine engine is to appear in the labeled masked image, and
wherein the at least one statistical distribution further comprises at least one Gaussian distribution.

10. The method of claim 7, further comprising:
providing at least one loss function, wherein the at least one loss function represents a confidence that the labeled masked image depicts one or more objects in the one or more actual images of equipment,
wherein pixels of the labeled masked image are annotated with indications of objects represented by the pixels.

11. The method of claim 10, further comprising:
determining that the labeled masked image depicts the one or more objects in the one or more actual images of equipment if the loss function is less than or equal to a predetermined threshold,
wherein pixels of the unlabeled image are not annotated with indications of objects represented by the pixels.

12. The method of claim 10, further comprising:
determining that the labeled masked image does not depict the one or more objects in the one or more actual images of equipment if the loss function is greater than or equal to a predetermined threshold,
wherein the image mask is a binary mask including two different types of areas to appear in the labeled masked image.

13. A system comprising: one or more processors configured to receive an actual image of equipment, the actual image not including annotations of what object is represented by each pixel in the actual image, the one or more processors also configured to obtain an image mask, the image mask representing one or more selected areas where damage to the equipment is to appear, the one or more processors configured to generate a labeled masked image by combining the actual image with the image mask, wherein the labeled masked image includes annotations of what object is represented by plural pixels in the one or more selected areas from the image mask: and at least one camera communicatively coupled to the one or more processors, wherein the at least one camera provides the actual image of equipment to the one or more processors; and wherein a first type of the types of areas to appear in the labeled masked image is an artificial appearance of damage to the equipment and a second type of the types of areas to appear in the labeled masked image is an unchanged portion of the unlabeled image, and wherein the labeled masked image comprises at least one artificial anomaly, the at least one artificial anomaly superimposed onto at least one unlabeled image, the at least one artificial anomaly configured to at least one of: replace, occlude view of, entirely overlap, and partially overlap at least one real anomaly in the actual image.

14. The system of claim 13, further comprising:
at least one controller communicatively coupled to the one or more processors, the at least one controller configured to control the operation of at least one powered system:
at least one memory communicatively coupled to the one or more processors, the at least one memory configured to store the actual image; and
at least one output device communicatively coupled to the one or more processors,
wherein the one or more processors are configured to train an artificial neural network using the labeled masked image to automatically identify equipment damage appearing in one or more additional images of equipment.

15. The system of claim 14, wherein the one or more processors are configured to generate one or more training images for training an artificial neural network to automatically identify equipment damage appearing in the one or more additional images of equipment, and
wherein the at least one powered system comprises an automated robotic system for repairing a component of the equipment.

16. The system of claim 15, wherein the equipment includes a turbine engine and the one or more selected areas indicate locations on the turbine engine where damage to a coating of the turbine engine is to appear in the labeled masked image, and
wherein the automated robotic system is configured to spray an additive onto a coating of the component of the equipment.

17. The system of claim 14, wherein the image mask is a binary mask including two different types of areas to appear in the labeled masked image,
wherein the at least one powered system comprises a vehicle, and
wherein the controller changes the direction of the vehicle to avoid a collision with an object identified by the system.

* * * * *